US010724132B2

(12) United States Patent
Soloway

(10) Patent No.: US 10,724,132 B2
(45) Date of Patent: Jul. 28, 2020

(54) METHOD OF PREPARING AEROGEL PARTICLES AND AEROGEL COATED COMPONENT

(71) Applicant: GENERAL ELECTRIC COMPANY, Schenectady, NY (US)

(72) Inventor: Daniel David Soloway, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 378 days.

(21) Appl. No.: 15/478,891

(22) Filed: Apr. 4, 2017

(65) Prior Publication Data

US 2018/0282852 A1 Oct. 4, 2018

(51) Int. Cl.

| | |
|---|---|
| *B01J 2/08* | (2006.01) |
| *C23C 4/134* | (2016.01) |
| *B05D 1/12* | (2006.01) |
| *B01J 13/00* | (2006.01) |
| *C23C 4/04* | (2006.01) |
| *C04B 35/48* | (2006.01) |
| *C04B 35/622* | (2006.01) |

(52) U.S. Cl.
CPC ........... *C23C 4/134* (2016.01); *B01J 13/0091* (2013.01); *B05D 1/12* (2013.01); *C04B 35/01* (2013.01); *C04B 35/10* (2013.01); *C04B 35/14* (2013.01); *C04B 35/48* (2013.01); *C04B 35/62222* (2013.01); *C04B 35/62655* (2013.01);
(Continued)

(58) Field of Classification Search

CPC ............................ C23C 4/134; B01J 13/0091

See application file for complete search history.

(56) References Cited

U.S. PATENT DOCUMENTS 6,051,279 A * 4/2000 Gualco .................... C23C 4/04 427/447

2003/0129320 A1* 7/2003 Yu ........................ C04B 38/009 427/453

(Continued)

FOREIGN PATENT DOCUMENTS

| | | | |
|---|---|---|---|
| EP | 0897019 | A1 | 2/1999 |
| EP | 1153739 | A1 | 11/2001 |

(Continued)

OTHER PUBLICATIONS

C.T. Wang et al., "Humidity Sensors Based on Silica Nanoparticle Aerogel Thin Films," Sensors and Actuators B: Chemical, vol. 107, Issue 1 (2005), pp. 402-410, Elsevier, published online Dec. 15, 2004.

(Continued)

*Primary Examiner* — Michael A Salvitti
(74) *Attorney, Agent, or Firm* — McNees Wallace & Nurick LLC

(57) ABSTRACT

A method for preparing aerogel particles and a coated component are provided. The coated component includes a substrate and a coating. The coating includes aerogel particles sprayed from a hot gas jet or plasma jet. The method includes the step of feeding one or a plurality of gel particles into a hot gas jet or plasma j et. The one or a plurality of gel particles are sufficiently small to permit supercritical drying during the time the particles are in the jet. The method further includes the step of exposing the one or a plurality of gel particles to the temperatures and pressures of the hot gas jet or plasma jet to create the aerogel particles outside of a jet emitter and/or without a sealed pressure vessel.

13 Claims, 3 Drawing Sheets

(51) Int. Cl.
    *C04B 35/10*     (2006.01)
    *C04B 35/14*     (2006.01)
    *C04B 38/00*     (2006.01)
    *C04B 35/626*    (2006.01)
    *C04B 35/01*     (2006.01)
    *C04B 111/00*    (2006.01)

(52) U.S. Cl.
    CPC ............ *C04B 38/0045* (2013.01); *C23C 4/04* (2013.01); *B01J 13/0052* (2013.01); *C04B 2111/00482* (2013.01); *C04B 2111/00525* (2013.01); *C04B 2111/00551* (2013.01); *C04B 2235/3217* (2013.01); *C04B 2235/3218* (2013.01); *C04B 2235/3244* (2013.01); *C04B 2235/3246* (2013.01); *C04B 2235/3418* (2013.01)

(56) References Cited

U.S. PATENT DOCUMENTS

| | | | |
|---|---|---|---|
| 2006/0222777 A1 | 10/2006 | Skoog et al. | |
| 2008/0241490 A1* | 10/2008 | Newman | C04B 35/111 428/206 |
| 2009/0117268 A1* | 5/2009 | Lewis | B05D 1/60 427/205 |
| 2012/0094036 A1* | 4/2012 | Droege | C09D 7/70 427/600 |
| 2012/0189782 A1 | 7/2012 | Zafiropoulos et al. | |
| 2013/0095340 A1 | 4/2013 | Sivakumar et al. | |
| 2013/0116369 A1* | 5/2013 | Qi | G03G 15/2057 524/157 |
| 2017/0166485 A1* | 6/2017 | Hong | C04B 30/00 |
| 2018/0282852 A1* | 10/2018 | Soloway | C23C 4/134 |
| 2019/0225498 A1* | 7/2019 | Ruiz | B01J 2/08 |

FOREIGN PATENT DOCUMENTS

| | | |
|---|---|---|
| EP | 2974858 A1 | 1/2016 |
| WO | 2011025569 A1 | 3/2011 |

OTHER PUBLICATIONS

Extended European Search Report and Opinion issued in connection with corresponding EP Application No. 18164140, dated Jun. 26, 2018.

* cited by examiner

```
                            ┌──────────────────────────────────────┐── 200
                            │                                      │
                            ▼

┌──────────────────────────────────────┐── 201
                │        Providing gel particles       │
                └──────────────────────────────────────┘
                                    │
                                    ▼
                ┌──────────────────────────────────────┐── 202
                │   Delivering gel particles to hot gas jet   │
                └──────────────────────────────────────┘
                                    │
                                    ▼
                ┌──────────────────────────────────────┐── 203
                │   Forming aerogel particles in hot gas jet  │
                └──────────────────────────────────────┘
                                    │
                                    ▼
                ┌──────────────────────────────────────┐── 204
                │  Directing aerogel particles to a substrate │
                └──────────────────────────────────────┘
```

FIG. 2

METHOD OF PREPARING AEROGEL PARTICLES AND AEROGEL COATED COMPONENT

FIELD OF THE INVENTION

The present invention is generally directed to a method of preparing aerogel particles and aerogel coated component. More specifically, the present invention is generally directed to a method of preparing aerogel particles using a hot gas jet or plasma jet and aerogel coated component.

BACKGROUND OF THE INVENTION

Aerogel materials have extremely low coefficients of thermal conductivity due to their extremely high porosity, making them excellent thermal insulators. Aerogels are made using a technique called supercritical drying where a gel is heated and pressurized until the liquid component of the gel is supercritical, where a liquid and a gas exist simultaneously, and then depressurized and/or cooled into a gaseous phase. By avoiding the boundary between liquid and gaseous phases in this way, the gel does not develop the high surface tension in its structure that it would experience in "typical" drying.

The aerogel structure is typically created in a chamber where the supercritical fluid diffuses into the air in the chamber, and thus out of the gel. In some processes, the air in the chamber is then purged and replaced with new air is typically repeated several times until all or most of the liquid is gone from the gel, leaving an aerogel. However, such method requires a chamber that can be pressurized and heated and introduces some limitations such as size limitations of final aerogel product.

BRIEF SUMMARY OF THE INVENTION

In an exemplary embodiment, a method for preparing aerogel particles is provided. The method includes the step of feeding one or a plurality of gel particles into a hot gas jet or plasma jet. The one or a plurality of gel particles are sufficiently small to permit supercritical drying during the time the particles are in the jet. The method further includes the step of exposing the one or a plurality of gel particles to the temperatures and pressures of the hot gas jet or plasma jet to create the one or a plurality of aerogel particles.

In another exemplary embodiment, a method for preparing aerogel particles is provided. The method includes the step of feeding one or a plurality of gel particles into a hot gas jet or plasma jet. The method further includes the step of exposing the one or a plurality of gel particles to the temperatures and pressures of the hot gas jet or plasma jet to create the one or a plurality of aerogel particles.

In another exemplary embodiment, a coated component is provided. The coated component includes a substrate and a coating. The coating includes aerogel particles sprayed from a hot gas jet or plasma jet.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 2 shows a flow chart diagram illustrating an embodiment of a method.

Wherever possible, the same reference numbers will be used throughout the drawings to represent the same parts.

DETAILED DESCRIPTION OF THE INVENTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Provided are exemplary a method for preparing aerogel particles and a coated component. Embodiments of the present disclosure, in comparison to methods and articles not utilizing one or more features disclosed herein, enable aerogel to be supercritically dried in a hot gas jet or plasma jet, coating without seams, and coating components having complex geometries.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "at least one," as used herein, means one or more and thus includes individual components as well as mixtures/combinations.

The term "comprising" (and its grammatical variations), as used herein, is used in the inclusive sense of "having" or "including" and not in the exclusive sense of "consisting only of "

Figure 3:
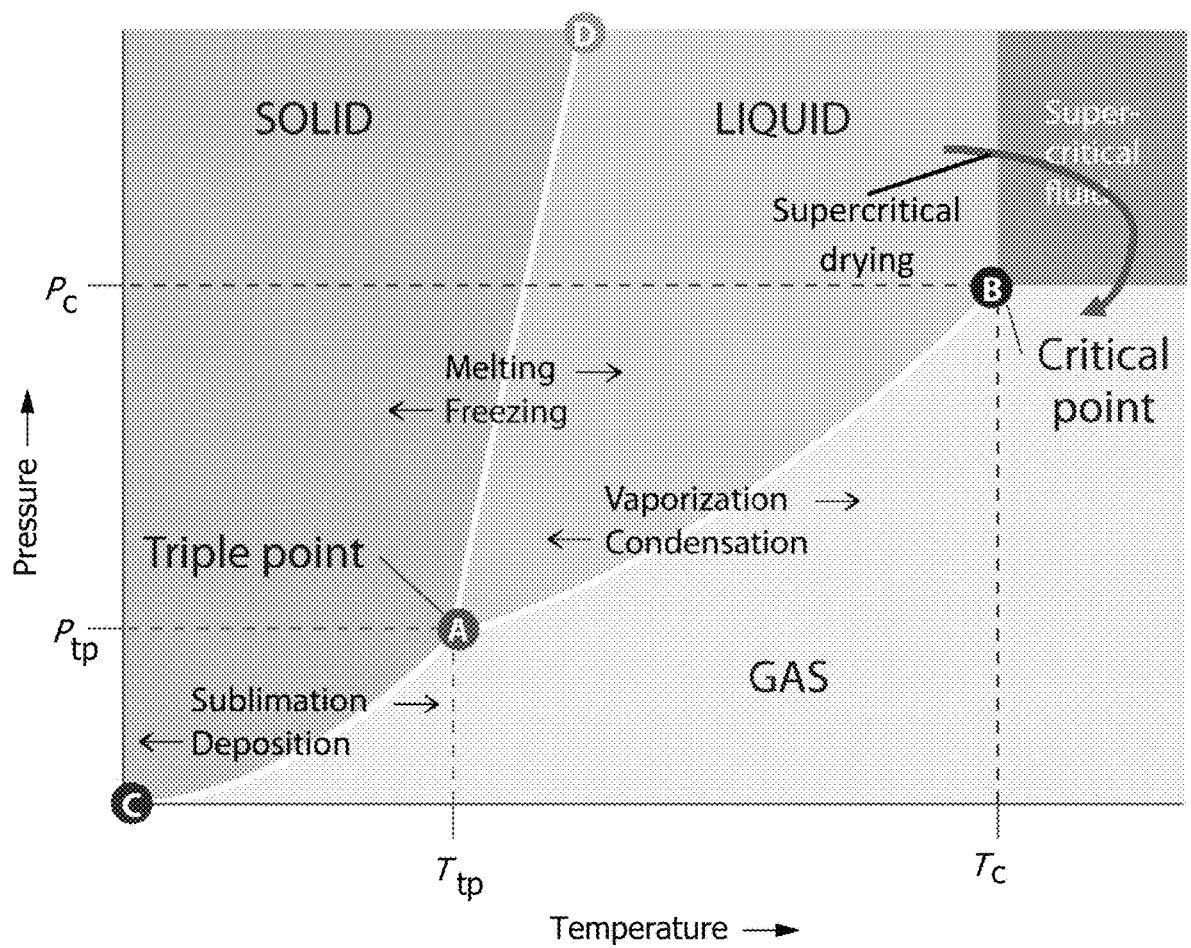
FIG. 3 shows a phase diagram illustrating supercritical drying.

The term "supercritical drying," as used herein, means a process wherein a gel is heated and pressurized until the liquid component of the gel is supercritical, where a liquid and a gas exist simultaneously, and then depressurized and/or cooled into a gaseous phase, as seen in FIG. 3.

Figure 1:
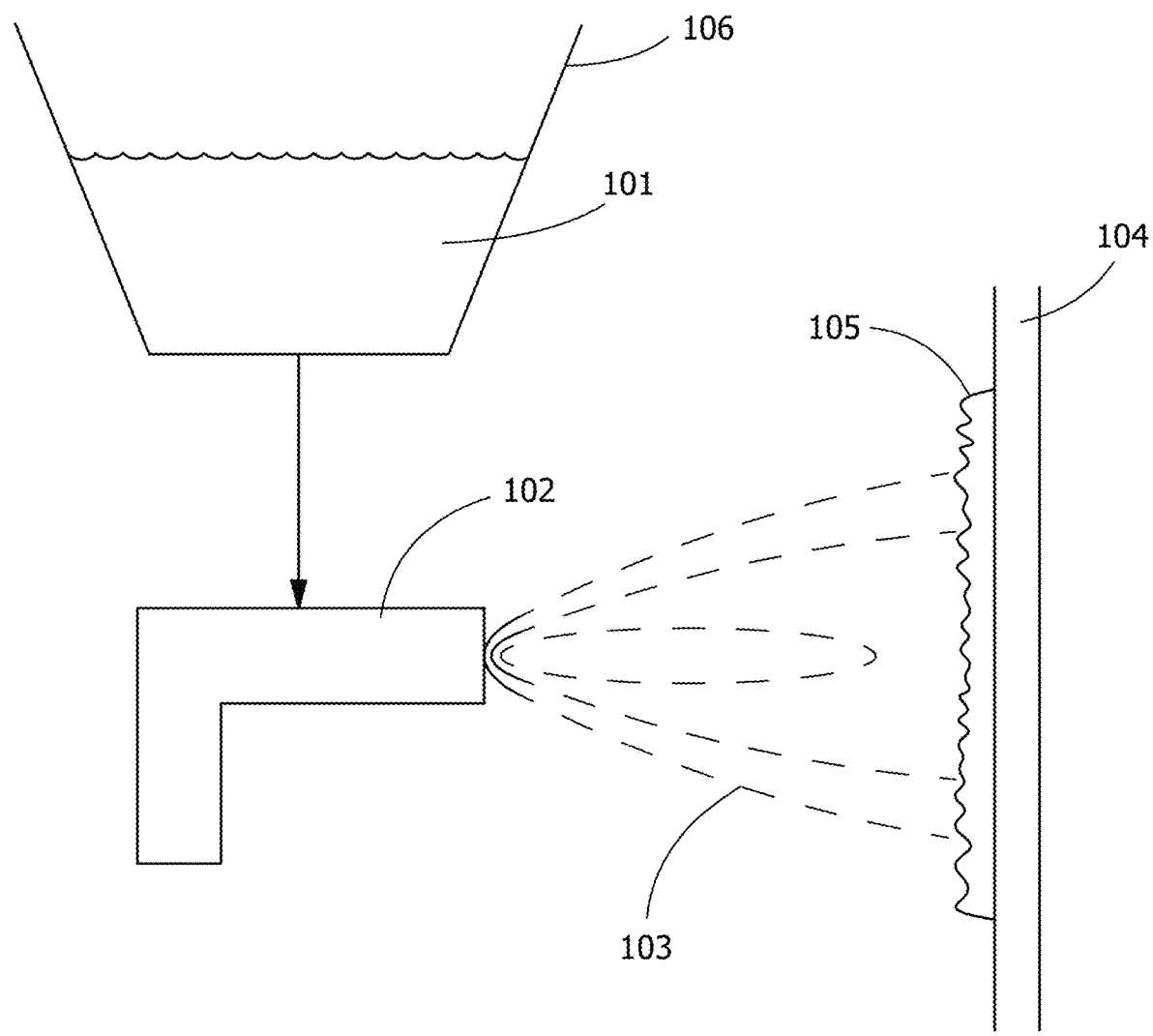
FIG. 1 illustrates a method, according to an exemplary embodiment of the present disclosure.

With reference to FIG. 1, a jet emitter 102 is provided. One or a plurality of gel particles 101 are fed from a receptacle 106 into the jet emitter 102. The one or a plurality of gel particles 101 are pressurized in the jet emitter 102 and emitted to the hot gas jet or plasma jet 103. Then, the one or a plurality of gel particles 101 are emitted to be exposed to the temperatures and pressures of the hot gas jet or plasma jet 103 and depressurized and/or cooled rapidly to create the aerogel particles 105. The one or a plurality of gel particles 101 are sufficiently small to permit supercritical drying in the hot gas jet or plasma jet 103. In one embodiment, the sufficiently small one or a plurality of gel particles 101 are smaller than or equal to about 2mm in diameter. If the one or a plurality of gel particles 101 are sufficiently small, and the temperature and pressure of hot gas jet or plasma jet 103 are sufficient for supercritical drying of the liquid component of the gel, then the one or a plurality of gel particles 101 should undergo supercritical drying in the hot gas jet or plasma jet 103 to diffuse liquid out of the gel, thereby creating the aerogel particles 105.

In one embodiment, the aerogel particles 105 can be sprayed onto a substrate 104. In one embodiment, the aerogel particles 105 are attached to the substrate 104 via a mechanical bonding or a chemical bonding. The substrate 104 may be a surface of a large component including an abradable seal, a turbine component, a reservoir, a cryogenic device, a pipe, a pipe system for natural gas and oil, a barge, a ship, or a combination thereof, or other surfaces. In one embodiment, the substrate 104 may be pre-heated before spraying. In one embodiment, aerogel particles 105 sprayed onto a substrate 104 function as a thermal barrier coating (TBC) or an environmental barrier coating (EBC). In one embodiment, the aerogel particles 105 may be applicable for additive manufacturing process.

With reference to FIG. 2, a method 200 of for preparing aerogel particles 105 is provided, according to an exemplary embodiment. The method 200 includes the step of providing gel particles 101 (step 201). The method 200 further includes the step of delivering gel particles 101 to hot gas jet or plasma jet 103 (step 202). The method 200 further includes the step of forming aerogel particles 105 in hot gas jet or plasma jet 103 (step 203). The method 200 further includes the step of directing aerogel particles 105 to a substrate 104 (step 204).

In one embodiment, the one or a plurality of gel particles 101 are mixed with additive materials to form a mixed composite material when exposed to the supercritical temperatures and pressures of the hot gas jet or plasma jet 103. The mixed composite material is sprayed onto a substrate 104. The one or a plurality of gel particles 101 may include, but not be limited to, silica, zirconia, yttria doped zirconia, ceramic particles suspended in zirconia, yttria doped zirconia, or a combination thereof The liquid part of gel particles 101 may include, but not be limited to, water, liquid CO2, a combination thereof, or any suitable liquid. The additive materials may include, but not be limited to, a ceramic, an alumina based ceramic, a silicon based ceramic, a zirconia based ceramic, or a combination thereof. In an embodiment, the zirconia based ceramic includes a zirconia gel doped with yttrium. The additive materials further may include polyester to increase porosity.

In one embodiment, the aerogel particles 105 are sprayed to a surface to create aerogel in the form of powder, bead, tile, chip, or combinations thereof In one embodiment, a primary coating is applied onto the substrate 104 before spraying aerogel particles onto the desired surface. The primary coating may include, but not limited to, ceramic TBC, HVOF, aluminide, or combinations thereof. In another embodiment, a primary coating is not applied onto the substrate 104 before spraying aerogel particles onto the desired surface.

In one embodiment, a hot gas jet or plasma jet 103 includes plasma jet, air jet, air plasma jet, vacuum plasma jet, $CO_2$ jet, HVOF jet (High Velocity Oxygen Fuel jet), D-gun, cold spray, flame spray, wire arc, or a combination thereof In one embodiment, one or a plurality of gel particles 101 are atomized before being fed from a receptacle 106 into the jet emitter 102. The atomization may include nozzle atomization, ultrasonic atomization, or centrifugal atomization.

In one embodiment, the aerogel particles 105 are created without a sealed pressure vessel. The term "sealed pressure vessel" as utilized herein is a vessel or chamber that is closed and capable of controlling pressure inside. In one embodiment, the aerogel particles 105 are created outside of the jet emitter 102. In one embodiment, the aerogel particles 105 are created without a sealed pressure vessel and/or outside of the jet emitter 102.

In one embodiment, a coated component 107 including a substrate 104 and a coating portion 105 is provided. The coating 105 includes aerogel particles sprayed from a hot gas jet or plasma j et 103. The substrate 104 may comprise, but not be limited to, stainless steel, nickel-based alloys, steel, titanium, CMCs, aluminum-based alloys or combinations thereof While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for preparing, and, optionally, applying, aerogel particles, comprising:
feeding one or a plurality of gel particles into a hot gas jet or plasma jet, the one or the plurality of gel particles being sufficiently small to permit supercritical drying in the hot gas jet or plasma jet;
exposing the one or the plurality of gel particles to the temperatures and pressures of the hot gas jet or plasma jet to create the aerogel particles.

2. The method of claim 1, wherein the hot gas jet or plasma jet is selected from the group consisting of plasma jet, air jet, air plasma jet, $CO_2$ jet, HVOF jet, and combinations thereof.

3. The method of claim 1, wherein the feeding includes atomizing the one or the plurality of gel particles.

4. The method of claim 1, wherein the aerogel particles are created without a sealed pressure vessel.

5. The method of claim 1, further comprising spraying the aerogel particles onto a desired surface.

6. The method of claim 5, wherein the desired surface is a surface of a large component selected from the group consisting of an abradable seal, a turbine component, a reservoir, a cryogenic device, a pipe, a pipe system for natural gas and oil, a barge, a ship, and combinations thereof.

7. The method of claim 5, further comprising applying a primary coating onto the desired surface prior to spraying the aerogel particles onto the desired surface.

8. The method of claim 1, further comprising mixing additive materials with the one or the plurality of gel particles to form a mixed composite material before exposing the one or the plurality of gel particles to the temperatures and pressures of the hot gas jet or plasma jet to create the aerogel particles.

9. The method of claim 8, further comprising spraying the mixed composite material onto a desired surface.

10. The method of claim 8, wherein the additive materials are selected from the group consisting of a ceramic, an alumina based ceramic, a silicon based ceramic, a zirconia based ceramic, and combinations thereof.

11. The method of claim 10, wherein the additive materials further includes polyester.

12. The method of claim 9, further comprising applying a primary coating onto the desired surface prior to spraying the mixed composite material onto the desired surface.

13. A method for preparing aerogel particles, comprising:
feeding one or a plurality of gel particles into a hot gas jet or plasma jet;
exposing the one or the plurality of gel particles to the temperatures and pressures of the hot gas jet or plasma jet to create the aerogel particles.

\* \* \* \* \*